(12) United States Patent
Kosonen et al.

(10) Patent No.: US 11,224,829 B2
(45) Date of Patent: Jan. 18, 2022

(54) METHOD AND ARRANGEMENT FOR CONTROLLING A DEWATERING PROCESS

(71) Applicant: OUTOTEC (FINLAND) OY, Espoo (FI)

(72) Inventors: Mika Kosonen, Lappeenranta (FI); Sakari Kauvosaari, Kurkimäki (FI)

(73) Assignee: OUTOTEC (FINLAND) OY, Espoo (FI)

(*) Notice: Subject to any disclaimer, the term of this patent is extended or adjusted under 35 U.S.C. 154(b) by 153 days.

(21) Appl. No.: 16/483,549

(22) PCT Filed: Feb. 10, 2017

(86) PCT No.: PCT/FI2017/050078
§ 371 (c)(1),
(2) Date: Aug. 5, 2019

(87) PCT Pub. No.: WO2018/146371
PCT Pub. Date: Aug. 16, 2018

(65) Prior Publication Data
US 2020/0129887 A1 Apr. 30, 2020

(51) Int. Cl.
*B01D 21/30* (2006.01)
*B01D 21/01* (2006.01)
(Continued)

(52) U.S. Cl.
CPC ............ *B01D 21/302* (2013.01); *B01D 21/01* (2013.01); *B01D 21/08* (2013.01); *B01D 21/14* (2013.01);
(Continued)

(58) Field of Classification Search
CPC ...... B01D 21/302; B01D 21/01; B01D 21/08; B01D 21/14; B01D 21/32; B01D 21/34;
(Continued)

(56) References Cited

U.S. PATENT DOCUMENTS 4,226,714 A 10/1980 Furness et al.
4,861,492 A * 8/1989 Lehmkuhl .............. B01D 21/01
210/709
(Continued)

FOREIGN PATENT DOCUMENTS

WO 9743027 A1 11/1997

OTHER PUBLICATIONS

International Search Report issued by the Finnish Patent and Registration Office acting as the International Searching Authority in relation to International Application No. PCT/FI2017/050078 dated Jun. 5, 2017 (5 pages).

(Continued)

*Primary Examiner* — Bradley R Spies
*Assistant Examiner* — Jeannie Mcdermott
(74) *Attorney, Agent, or Firm* — Robert P. Michal, Esq.; Carter, DeLuca & Farrell LLP

(57) ABSTRACT

An arrangement and a method for controlling a dewatering process including measuring values representing operating parameters of the gravitational sedimentation device and using the values as input values for a predictive multivariable model for predicting an operating state of the gravitational sedimentation device. The disclosure further relates to obtaining reference values for the operating parameters, determining at least one predicted output for an operating parameter of the gravitational sedimentation device, and comparing the predicted output to at the reference values to determine control values that will affect changes in operation of the gravitational sedimentation device.

25 Claims, 4 Drawing Sheets

(51) Int. Cl.
   *B01D 21/08*   (2006.01)
   *B01D 21/06*   (2006.01)
   *B01D 21/32*   (2006.01)
   *B01D 21/34*   (2006.01)
   *C02F 1/52*    (2006.01)
   *G05B 13/04*   (2006.01)

(52) U.S. Cl.
   CPC ............. *B01D 21/32* (2013.01); *B01D 21/34* (2013.01); *C02F 1/5281* (2013.01); *G05B 13/042* (2013.01); *G05B 13/048* (2013.01); *C02F 2209/10* (2013.01); *C02F 2209/11* (2013.01); *C02F 2209/40* (2013.01); *C02F 2209/42* (2013.01)

(58) Field of Classification Search
   CPC .... B01D 21/2427; B01D 21/30; B01D 21/02; B01D 21/06; B01D 2221/04; B01D 21/0006; B01D 21/0042; B01D 21/0087; C02F 1/5281; C02F 2209/10; C02F 2209/11; C02F 2209/40; C02F 2209/42; C02F 2001/007; C02F 1/52; G05B 13/042; G05B 13/048; G05B 13/04; G05B 15/00; G05B 13/044; G05B 13/041; G01B 15/00; G01N 1/20
   See application file for complete search history.

(56) References Cited

U.S. PATENT DOCUMENTS

| | | | |
|---|---|---|---|
| 2008/0296232 A1* | 12/2008 | Wegner | C02F 1/66 |
| | | | 210/725 |
| 2009/0308815 A1 | 12/2009 | Sauvignet et al. | |
| 2014/0315705 A1 | 10/2014 | Miller et al. | |
| 2016/0070257 A1* | 3/2016 | Virtanen | G05B 13/04 |
| | | | 700/99 |
| 2016/0082367 A1* | 3/2016 | Berger | C02F 1/70 |
| | | | 210/710 |
| 2016/0250570 A1* | 9/2016 | Hunt | B01D 37/03 |
| | | | 210/105 |
| 2020/0038782 A1* | 2/2020 | Bose | B01D 21/01 |

OTHER PUBLICATIONS

Written Opinon of the International Searching Authority issued by the Finnish Patent and Registration Office acting as the International Searching Authority in relation to International Application No. PCT/FI2017/050078 dated Jun. 5, 2017 (8 pages).
Guillermo Cortes: "Thickeners multivariable predictive control: Division Codelco Norte", Nov. 12, 2010 (Nov. 12, 2010).
Written Opinion of the International Preliminary Examining Authority issued by the European Patent Office acting as the International Preliminary Examining Authority in relation to International Application No. PCT/FI2017/050078 dated Jan. 24, 2019 (4 pages).
Written Opinion of the International Preliminary Examining Authority issued by the European Patent Office acting as the International Preliminary Examining Authority in relation to International Application No. PCT/FI2017/050078 dated Apr. 11, 2019 (5 pages).
Juan Pable Segovia et al: "On the control of sludge level and underflow concentration in industrial thickeners—ScienceDirect", Jan. 2011 (Jan. 1, 2011), Retrieved from the Internet: URL:https://www.sciencedirect.com/science/article/pii/S1474667016449876.
Examination Report issued by the Australian Government in relation to Australian Application No. 2017398212 dated Apr. 24, 2020 (2 pages).
International Preliminary Report on Patentability issued by the European Patent Office acting as the International Preliminary Examining Authority in relation to International Application No. PCT/FI2017/050078 dated Sep. 18, 2019 (5 pages).
Mexican Office Action issued by the Mexican Patent and Trademark Office in relation to Mexican Application No. MX/u/2018/000073 dated Sep. 14, 2021 (7 pages) along with English language translation (6 pages).

* cited by examiner

METHOD AND ARRANGEMENT FOR CONTROLLING A DEWATERING PROCESS

CROSS-REFERENCE TO RELATED APPLICATIONS

This application is a national phase entry under 35 U.S.C. 371 of PCT International Application No. PCT/FI2017/050078 filed Feb. 10, 2017, the disclosure of this application is expressly incorporated herein by reference in its entirety.

FIELD OF THE INVENTION

The present disclosure relates to a method and an arrangement for controlling a dewatering process in a gravitational sedimentation device. In particular, the present disclosure relates to multivariable control of a gravitational sedimentation process.

BACKGROUND OF THE INVENTION

Separation devices, such as thickeners, clarifiers and concentrators, are used for separating solids from suspensions (typically containing solids suspended in a liquid) and are often found in the mining, mineral processing, food processing, sugar refining, water treatment, sewage treatment, and other such industries. These devices typically comprise a tank in which solids are deposited from a suspension or solution and settle toward the bottom as pulp or sludge to be drawn off from below and recovered. A dilute liquor of lower relative density is displaced toward the top of the tank, for removal via an overflow launder. The suspension to be thickened is initially fed through a feed pipe, conduit or line into a feedwell disposed within the main tank. A rake assembly is conventionally mounted for rotation about a central drive shaft and typically has at least two rake arms having scraper blades to move the settled material inwardly for collection through an underflow outlet.

In its application to mineral processing, separation and extraction, ground ore is suspended as pulp in a suitable liquid medium such as water at a consistency which permits flow, and settlement in quiescent conditions. The pulp is settled from the suspension by a combination of gravity with or without chemical or mechanical processes. One or more separation devices may be part of a process chain so that the output of one device is provided as input for another.

There are various problems preventing the operators from running the separation devices in an efficient manner. Long process response times, long process delays and variation in the incoming mass flow make process control challenging. Many times this leads to variation in the quality of the underflow, in the quality of the overflow or both. This, in turn, may affect the performance of subsequent processes, i.e. filtering, tailings handling, and water re-circulation systems. Currently, controls for the separation devices such as thickeners are implemented as single loop controllers (e.g. PID controllers) in distributed control systems (DCS) or programmable logic controller (PLC) systems. Slow response dynamics and cross actions between the controlled parameters can make the tuning of the PI-loops very challenging and require compromises between system robustness and desired speed of response. In practical operating situations, this may result in need for repeated operator intervention and the controller being run either totally or partially in manual mode. In addition to reduced quality and increased variation in process outputs, also the expenditure of process chemicals may be increased.

SUMMARY OF THE INVENTION

The objective of the invention is to alleviate some or all of the disadvantages present in the state of the art.

In one aspect, an arrangement for controlling a dewatering process is disclosed. A dewatering process, for the purposes of this description, may refer to any process that involves separation of fluid from solid matter. The arrangement comprises a gravitational sedimentation device comprising a tank, a lip for removing overflow from the tank and at least one underflow line for removing underflow from the tank; a first and a second sensor for measuring a first and a second operating parameter representing the material consistency of the underflow from the gravitational sedimentation device and the inventory level of the gravitational sedimentation device, respectively; a controller for monitoring and adjusting operating parameters of the gravitational sedimentation device; and at least one memory comprising computer program code. The at least one memory and the computer program code configured to cause the controller to: receive a first set of values representing the first operating parameter input from the first sensor and a second input set of values representing the second operating parameter from the second sensor; then use at least the first set of values received from the first sensor input set and the second set of values received from the second sensor input set as input values for the a predictive multivariable model for predicting an operating state of the gravitational sedimentation device. The operating state is at least partially dependent on the operating parameters. The predictive multivariable model may be uploaded to the memory before the dewatering process, or may be generated during the process. The at least one memory and the computer program code are further configured to cause the controller to determine, using the predictive multivariable model, at least one predicted output for an operating parameter of the gravitational sedimentation device for at least one future point in time; obtain a set of one or more reference values for the operating parameters of the gravitational sedimentation device; perform a comparison between the at least one predicted output and at least one reference value from the set of one or more reference values; and determine, based at least partially on the comparison, at least one set of one or more control values for at least one control parameter of the gravitational sedimentation device. The at least one control parameter may at least partially determine the operating state of the gravitational sedimentation device. The at least one memory and the computer program code are further configured to cause the controller to adjust, using the at least one set of control values, at least one control parameter of the gravitational sedimentation device. A set of control values may comprise a time series or point values, and it may be continually updated.

In another aspect a method for controlling a dewatering process in a gravitational sedimentation device is disclosed. The method comprises measuring at least a first and a second set of one or more values representing operating parameters of the gravitational sedimentation device, the first set representing the consistency of the underflow of the gravitational sedimentation device and the second set representing the inventory level of the gravitational sedimentation device. The method also comprises obtaining a set of one or more reference values for the operating parameters of the gravitational sedimentation device and using at least the first set of one or more values and the second set of one or more values as input values for a predictive multivariable model for predicting an operating state of the gravitational sedimentation device, wherein the operating state is at least partially dependent on the operating parameters of the gravitational sedimentation device. The method further comprises determining, using the predictive multivariable model, at least one predicted output for an operating parameter of the gravitational sedimentation device for at least one future point in time and comparing the at least one predicted output to at least one reference value from the set of reference values. The method yet further comprises determining, based at least partially on the comparison, at least one set of one or more control values for at least one control parameter of the gravitational sedimentation device, wherein the at least one control parameter may at least partially determine the operating state of the gravitational sedimentation device, and adjusting, using the at least one set of control values, at least one control parameter of the gravitational sedimentation device.

As it is clear to a skilled person, steps of the process in the arrangement and in the method above are not necessarily performed chronologically in the same order as they are listed. For example, obtaining a set of one or more reference values may be carried out at any point throughout the process before the comparison between the predicted output and said reference values.

Further aspects may be anticipated based on the disclosure, for example a control device for controlling a dewatering process comprising the controller and the at least one memory as defined above for the first aspect. A second example is a data processing apparatus comprising a processor adapted to perform the method of claim 18. A third example is a computer program product for controlling a dewatering process comprising instructions which, when the program is executed by a computer, cause the computer to carry out the method of claim 18. A fourth example is an apparatus comprising means for performing each of the steps in the method of the methods disclosed herein. The arrangement according to the first aspect may also be considered as a system.

Technical effects which can be achieved by the present invention include reduced variation in the process output such as in the underflow density or in the overflow clarity, decreased usage of process chemicals such as flocculants and increased productivity resulting from the increase of time when the process is running according to correct specifications and the reduction of time and resources required due to manual operations. Part of the disclosure involves using a predictive multivariable model which may in turn be used for optimized determination of the control parameters of the dewatering process. In comparison to traditional rules-based expert systems, this approach allows the definition of process constraints in a new way. Depending on the operating parameters and the process constraints used, the approach may improve the efficiency of the process in various ways.

BRIEF DESCRIPTION OF THE DRAWINGS

The accompanying drawings, which are included to provide further understanding of the invention and constitute a part of this specification, illustrate embodiments of the invention and together with the description help to explain the principles of the invention.

DETAILED DESCRIPTION OF THE INVENTION

Reference will now be made in detail to the embodiments of the present disclosure, examples of which are illustrated in the accompanying drawings.

The dewatering process according to the disclosure may be considered as a separation process, in which fluid is separated from solid matter. The material to be separated in the process may be called process slurry. Typically, the carrier fluid is water but other fluids may also be used. In particular, the carrier fluid may comprise a mixture of water and process chemicals including for example acid/alkaline, metals, salts and others. To accelerate the sedimentation process, chemicals such as flocculants or coagulants may be used.

Several zones or layers of material having different overall densities gradually form within the tank. At the bottom of the tank, the pulp forms a relatively dense zone of compacted pulp or solids that are frequently in the form of networked aggregates (i.e. the pulp aggregates are in continuous contact with one another). This zone is called a "pulp bed" or a networked layer of pulp. Above the pulp bed, a hindered zone tends to contain solids that have not yet fully settled or "compacted". The time scale for the settling process may take from several minutes to several hours. Consequently, process control mechanisms according to the embodiments below can take into account the slow dynamics involved in the process.

Although a gravitational sedimentation device is disclosed in the following examples by reference to a thickener, it should be noted that the principles according to the disclosure can be implemented regardless of the specific type of the gravitational sedimentation device, e.g. by using a thickener or a clarifier. A thickener may be, for example, a conventional thickener, a paste thickener or a tailings thickener. The details of the device may depend on the particular phase of the separation process as the device may be used at various points along a line of separation devices in a multi-phase separation process.

Figure 1:
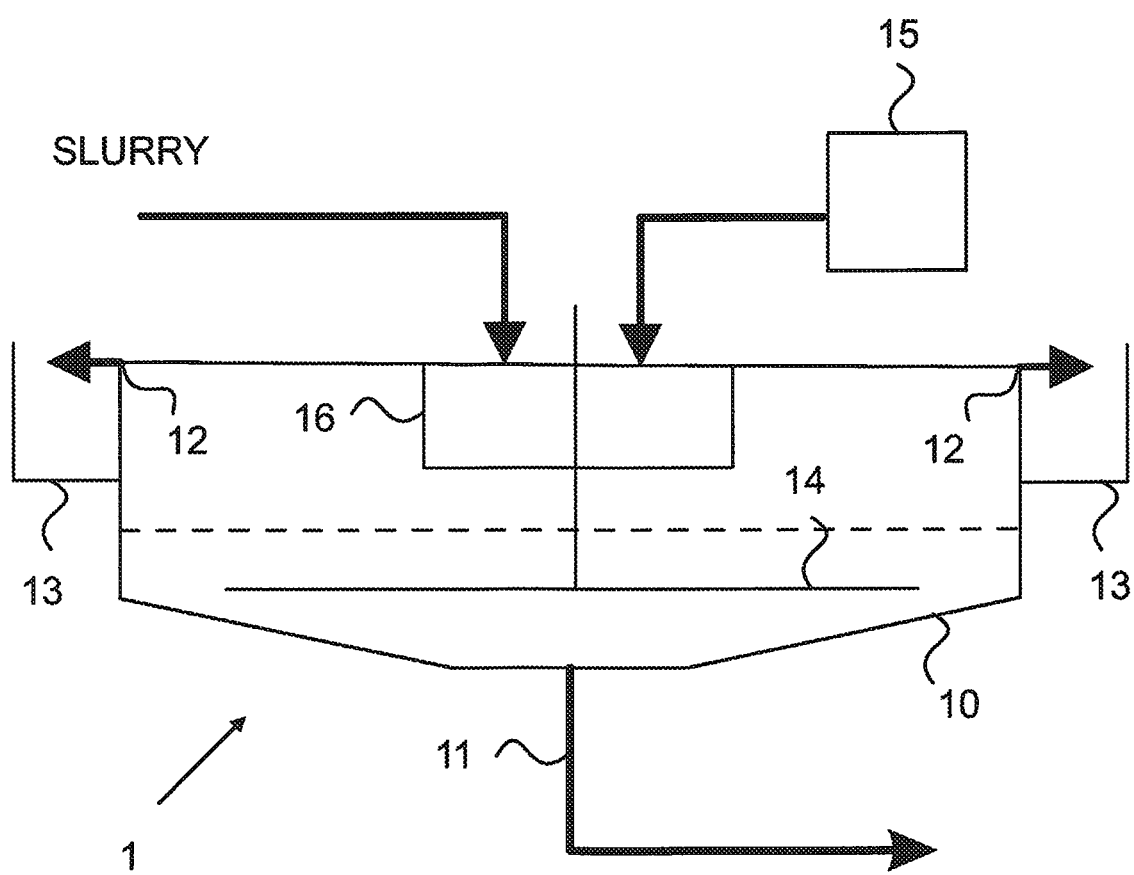
FIG. 1 is a schematic presentation of an exemplary embodiment of a gravitational sedimentation device according to the current disclosure.

FIG. 1 illustrates a gravitational sedimentation device 1 (hereafter "a thickener") in a schematic manner. The figures are not drawn to proportion, and many of the components of the thickener are omitted for clarity. Schematic directions for slurry flow, overflow, underflow and chemical feed are depicted by arrows.

In an embodiment of FIG. 1, a thickener 1 comprises a tank 10 for containing the material to be separated. In the figure, the dashed line represents the upper level of the pulp bed. The tank may be essentially cylindrical and it may additionally have a tapered bottom for guiding the solid material towards the center. The diameter of the tank may be 5-100 meters. The height of the tank may be 1-20 meters.

Underflow of the thickener corresponds to the separated solid, i.e. pulp, flowing out of the thickener. The water-solids ratio of the underflow may vary depending on various factors such as the phase or efficiency of the separation process. The tank may be connected to one or more underflow lines 11 for removing solid material from the tank. The receiving ends of the underflow lines may be located at the bottom of the tank. They may additionally be located essentially at the center of the tank.

Overflow of the thickener corresponds to the separated fluid flowing out of the thickener. In addition, the water-solids ratio of the overflow may vary depending on various factors such as the phase or efficiency of the separation process. The tank may be connected to an overflow lip 12 for removing fluid from the tank. The overflow lip may comprise the rim of the tank. Additionally, it may comprise a set of teeth spaced from each other around the rim of the tank. The overflow may be removed from the tank by allowing it to flow across the overflow lip. The tank may also be connected to a launder 13 for collecting the overflow from the tank. The collected overflow may be fed back into the separation process at a suitable phase.

The thickener may additionally comprise a rake 14 for guiding the solid material towards the underflow line or lines. The rake may comprise at least one blade rotating around a vertical shaft located in the middle of the tank. The rake is located, at least partially, inside the pulp bed.

The thickener may also comprise a chemical dispenser 15 for dispensing a chemical such as a coagulant or a flocculant into the tank. The thickener may comprise a feedwell 16 where both the chemical and the incoming slurry may initially be directed for mixing.

Figure 2:
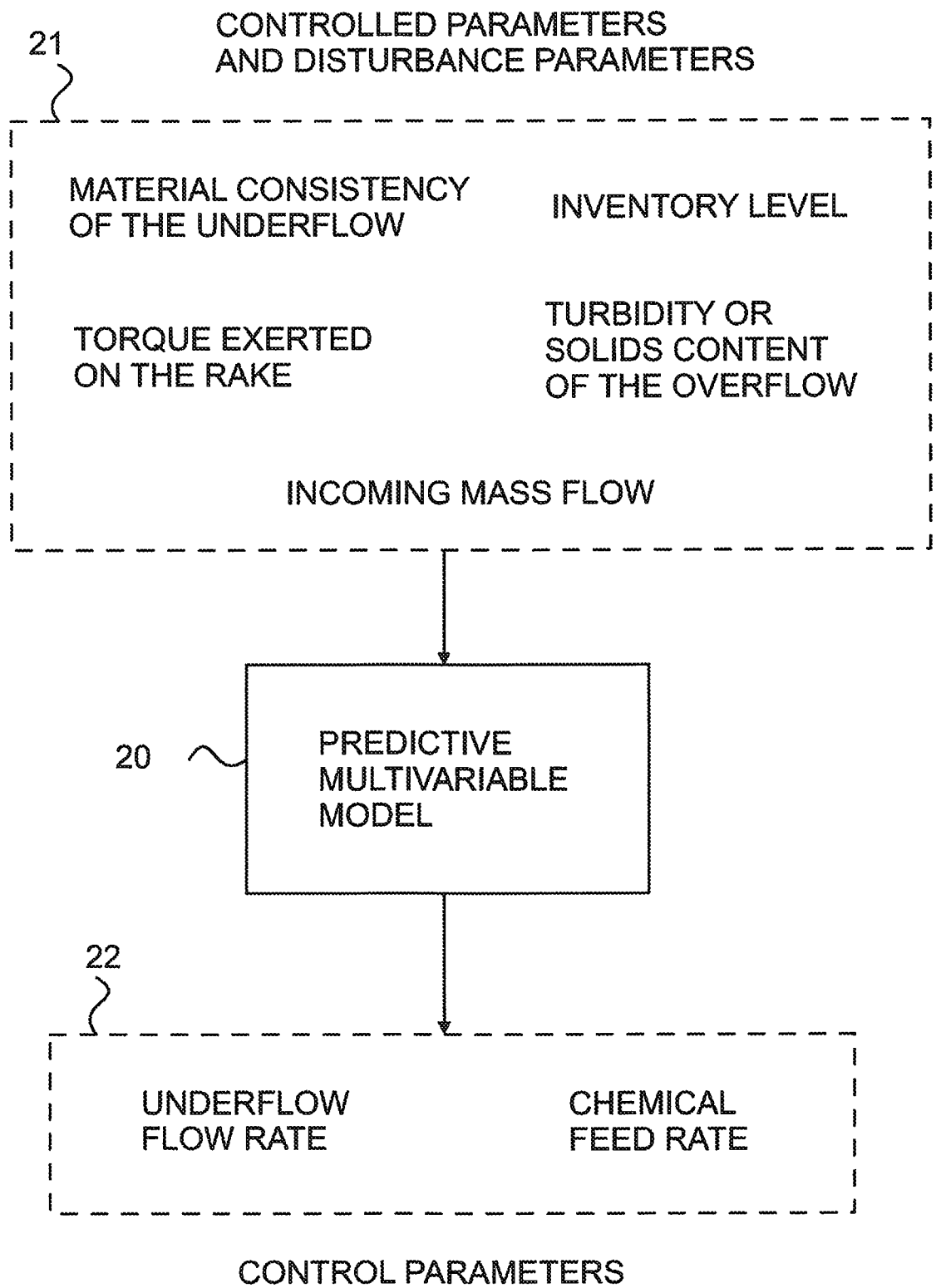
FIG. 2 illustrates an embodiment of a multivariable model for predicting an operating state of the gravitational sedimentation device according to the current disclosure.

FIG. 2 illustrates a predictive multivariable model according to an embodiment. An operating state of the thickener may be defined by its operating parameters. These may comprise controlled parameters 21, control parameters 22 and disturbance parameters 21 of the thickener. The control parameters of the thickener may be directly manipulated, automatically or by an operator, to affect the operating state of the thickener so that the values of the controlled parameters may change in response. Additionally, parameters which cannot directly or indirectly be controlled by the controller of the dewatering process are considered as disturbance parameters.

A predictive multivariable model 20 is constructed and used for predicting the operating state of the thickener. The model may use operating parameters of the thickener as input parameters. In an embodiment, the input parameters for the multivariable predictive model may include measured values of controlled parameters 21, change history of control variables 22, measured values of disturbance parameters 21. The predicted control variables and controlled variables may also be used as input for the model. As an output, the model produces a prediction of the operating state of the thickener for at least one future point in time. Being a multivariable model, at least two operating parameters are required for input. These operating parameters may include at least two controlled parameters. The actual parametrization of the model, which determines how the values of the input parameters determine the predicted output, may be performed using process tests, simulations or a combination of them. Consequently, the model itself may be defined in advance and stored in a memory. A predictive multivariable model may be used for process control to provide several effects such as to improve the handling of slow response dynamics or the cross actions between the controlled parameters. Additionally, a model-based control of the process allows taking into account various types of constraints, including min-max constraints, for the operating parameters and desired prioritization between the operating parameters, including the control parameters.

The predictive multivariable model 30 may use measurement values of the operating parameters as an input. The measurement values may comprise time series values, i.e., several measurement values for an operating parameter over a period of time. The model may also be configured to provide a predicted output for one or more time points in the future. In an embodiment, an "horizon" or limits of the time series may be determined in past and future, and the future prediction may be shown to the operator The measurement values may be repeatedly updated and the predicted output may be updated in response. The update frequency of the model and the predicted output may be different from that of the measurement frequency.

According to an embodiment, the model may be a dynamic response model. It may comprise, for example, a step response model or an impulse response model. The model may also utilize a model predictive control (MPC) algorithm.

In the context of the present disclosure, it has been discovered that for efficient multivariable control of the dewatering process a specific combination of operating parameters may be used to create a model describing the operating state of the thickener. The model may be used by a controller to predict the future operating state of the thickener and to determine control operations that guide the process towards a desired state. The controlled parameters may represent at least the material consistency of the underflow of the thickener and the inventory level of the thickener. Additional controlled parameters may be used including one or more of the following: the turbidity or solids content of the overflow of the thickener and a torque exerted on a rake of the thickener. Also disturbance parameters such as the mass flow into the thickener may be used. As a control parameter, at least the underflow flow rate of the thickener is used. However, also additional control parameters such as a chemical feed rate of the thickener may be used. It has been noted that the minimum set of two controlled and one control parameter including the material consistency of the underflow, the inventory level of the thickener and the underflow flow rate may be used for robust multivariable control of the thickener. Alternatively, a combination of three controlled and two control parameters including additionally the turbidity or solids content of the overflow and a chemical feed rate may be used for a more detailed description of the operating state of the thickener. In general, using more than one controlled parameter in a multivariable controller may allow prioritization between the controlled parameters. Accordingly, using more than one control parameter in a multivariable controller may allow prioritization between the control parameters.

Depending on the measurement configuration suitable for any particular application, the operating parameters introduced above may be determined in practice in more than one way. Material consistency of the underflow may be determined, for example, by measuring the solids content of the underflow or the pumping properties of the underflow. The measurement can be performed. The former measurement maybe performed, for example, by measuring the density of the underflow, and the latter, for example, by measuring the viscosity of the underflow. When the material consistency of the underflow is included in the model, the controller may monitor the quality of the underflow and/or its variation in time. Due to variations in the material consistency, the underflow may occasionally become too dense, resulting in the underflow lines becoming clogged. By reducing the variation, the likelihood for clogging may be reduced.

The inventory level of the thickener describes the size of the pulp bed in the tank. The inventory level may be measured, for example, as the level or height of the pulp bed or derived from hydraulic pressure on the bottom or sidewall of the thickener. When the inventory level of the thickener is included in the model, the controller may monitor the state of the pulp bed indicating the amount of solid material inside the tank.

A value for a parameter representing turbidity or solids content of the overflow may be measured directly from the overflow fluid. It may alternatively or in addition be measured indirectly, for example by measuring the fluid in the tank. The measurements may also comprise optical measurements, turbidity or solids content measurement based e.g. on water transparency (turbidity), back scattering for example by IR-light, ultra sound, microwave and others. When the turbidity or solids content is included in the model, the controller may monitor the quality of the overflow fluid.

A torque exerted on the rake may be measured at any point of the rake, for example at the tip of the blade. Measurement of torque may be derived from measuring hydraulic pressure or current, depending on the design of the drive system. This measurement may be performed in real time without pausing the process. When the torque exerted on the rake is included in the model, the controller may avoid performing control operations that would result in excess forces in the rake.

Mass flow into the thickener may be considered as a disturbance parameter, since any variances in the consistency of the slurry may not necessarily be controlled. However, in the event that at least some control over this parameter is possible also by the controller of the dewatering process, mass flow may be considered as one of the controlled parameters. The mass flow may be determined as a dry mass flow. The mass flow may, for example, be determined by measuring the flow rate of the incoming slurry into the thickener using a flow meter and the density of the incoming slurry using a density meter. When the mass flow into the thickener is included in the model, the controller may react to any changes in the incoming slurry before it has settled into the bottom of the tank.

For a thickener having more than one underflow lines, any parameter related to the underflow may be determined, for example, as an average of the corresponding parameter determined for the individual underflow lines.

The underflow flow rate may be controlled using flow control means such as a pump or a valve. When a pump is used, the underflow flow rate may be included in the model, for example, as the underflow pump speed. By using the underflow flow rate as a control parameter, the controller may speed up or slow down the removal of the solids from the thickener depending on the state of the thickener. The controller may also optimize the way the flow control means are used, for example by determining an optimal state for the flow control and performing other control operations so that the optimal state for flow control is maintained.

The chemical feed rate describes the amount of chemicals fed into the thickener during the process. By using the chemical feed rate as a control parameter, the controller may optimize the use of chemicals during the process.

To determine values for the controlled parameters, one or more sensors for each parameter may be used. The sensors may comprise flow sensors, density sensors, mass sensors, pressure sensors, solids content sensors, optical sensors e.g. measuring reflectivity, transparency or backscattering, force sensors, torque sensors etc.

Figure 3:
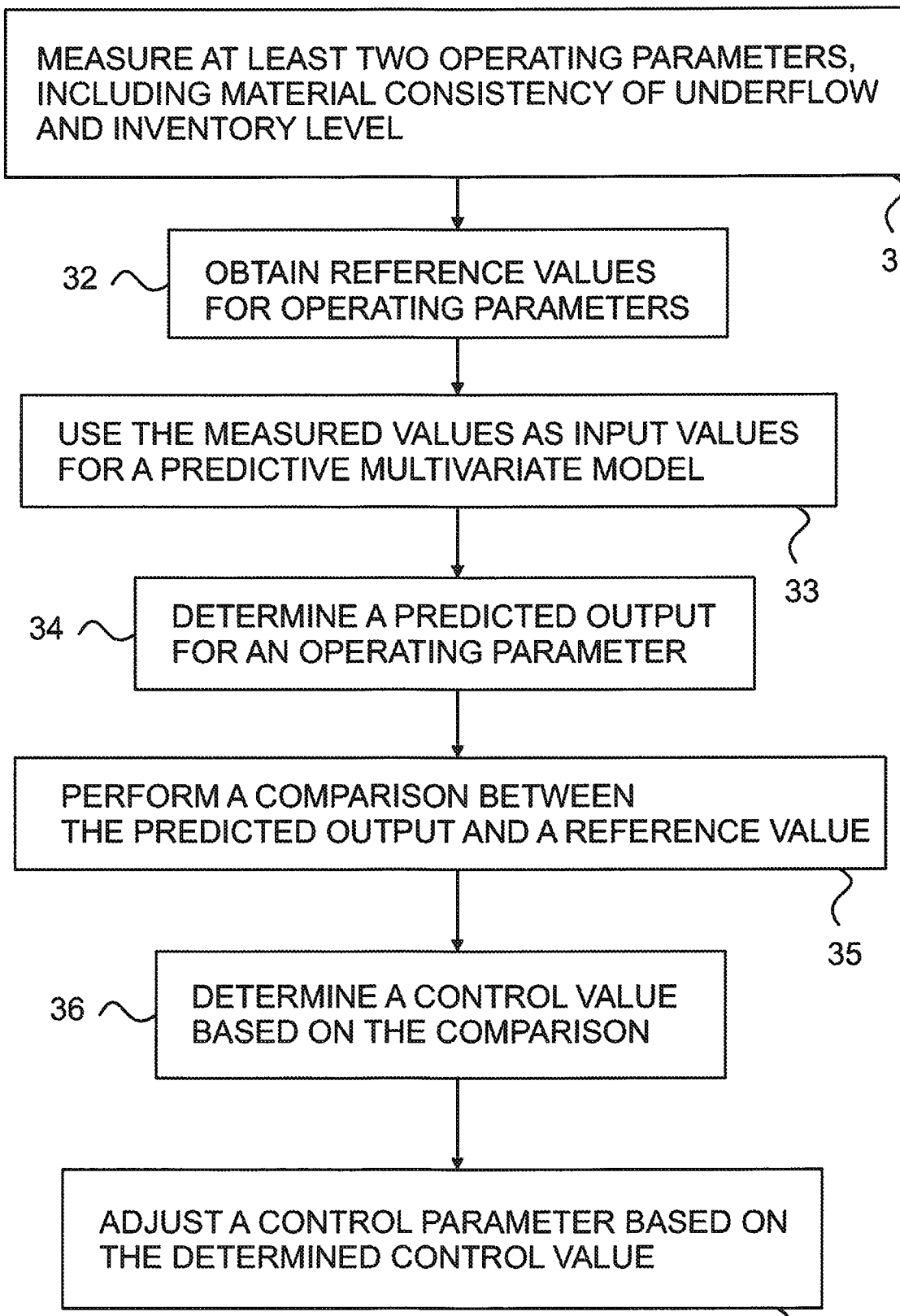
FIG. 3 illustrates a method for predictive multivariable model of a dewatering process according to an embodiment.

FIG. 3 illustrates method for predictive multivariable model of a dewatering process according to an embodiment. A controller may also be configured to perform the operations illustrated in the figure. Even though the operations are presented in a certain order, the actual order where they may be performed may vary.

In the embodiment of FIG. 3, values for at least two operating parameters are measured 31. The set of measured operating parameters comprise at least the material consistency of the underflow of the thickener and the inventory level of the thickener. The measurement results for each measured operating parameter may comprise one or more separate values measured at separate times. The measurement results may also be updated by subsequent measurements. At any phase of the process, a set of one or more reference values is obtained 32 for the operating parameters of the thickener. These reference values may comprise target values (i.e. setpoint values) for the operating parameters. They may also comprise limiting values such as minimum or maximum values for the operating parameters of the thickener. For a single operating parameter one or more reference values may be given. It is also possible to define reference values dependent on time so that an operating parameter has, for example, more than one target value corresponding to different future points in time. The reference values may be pre-determined or they may be provided or updated by an operator at any phase of the dewatering process. They may also be dynamically adjusted and the adjustment may depend on the state of the system.

At least a part of the measured values for operating parameters of the thickener is used 33 as input values for a predictive multivariable model. The predictive multivariable model may use the input values for predicting a future operating state of the thickener. Since the operating parameters at least partially determine the operating state of the thickener, the model also describes the operating state up to certain accuracy. As described above, the exact parametrization of the model may be performed, for example, by using process trials or simulations. Depending on the model parameters, the model may be provide 34 predicted outputs for any or all the operating parameters at one or more future points in time. The predicted output may be provided to an operator of the process.

At least one predicted output of the model is compared 35 to at least one of the reference values obtained to determine, how the predicted output relates to a desired output. The comparison may be separate to determining the output of the model so that a predicted horizon for the operating state is determined first and after that, the desired output as determined by one or more reference values is compared to the predicted output. The comparison may correspond to calculating the deviation between the predicted output and a reference value. The comparison may also correspond to using any mathematical relationship in determining how the predicted output relates to one or more reference values. For example a step function may be used to determine whether the predicted output is smaller than larger than a reference value or an exponential function may be used to represent a penalty for a predicted output depending on how close the predicted value is to a reference value.

The comparison may be used to determine 36 control values for control parameters for directing the operating state of the thickener towards a desired operating state as determined by the reference values. The determination may comprise optimizing the predicted output with respect to control values for control parameters. This may be performed, for example, by determining 34 the predicted output more than once using as an input different control values for one or more control parameters and by comparing 35 each predicted output to reference values to determine the preferred set of control values. This can be done using suitable mathematical optimization techniques for systems having a set of control variables and a set of constraints. The control values may be determined as single values for a control parameter or as a set of scheduled values. A control value may correspond to any present or future point in time.

Control parameters are adjusted 37 based on the control values. This may comprise, for example, adjusting the speed of an underfloor pump immediately or at a time determined by an adjustment schedule. It may also comprise adjusting a chemical feed rate into the tank or a feedwell of the thickener. If the control parameters comprise an adjustment schedule, this schedule may be followed. The schedule may also be provided to an operator of the process. It is, however, not necessary to follow this schedule but it may be provided only for informational purposes. For example, the operating state of the thickener may be predicted and displayed for an extended time horizon but the model may be updated before any control adjustments apart from the first are yet performed.

According to an embodiment, a cost function may be used for determining the control values. In such a case, the cost function may use as an input at least some of the predicted output values and at least some of the reference values. In the comparison phase 35, the value of the cost function may be determined based on a mathematical relationship between at least one predicted output value and at least one reference value. The determination may involve determining the relationship based on values corresponding to more than one point in time, for example by integrating the difference of a predicted value and a reference value for an operating parameter over a time interval. The control values used for adjustment 37 may be chosen to be those that minimize the cost function under the conditions determined by the reference values. It is noted that determining the set of control values minimizing the cost function may require several rounds of determining 34 the predicted output and comparing 35 that to reference values.

According to various embodiments, particular combinations of operating parameters and reference values are given. Any set of these combinations may be used together.

According to an embodiment, a target value (i.e. set-point value) may be assigned for the material consistency of the thickener. In such a case, the predicted output comprises a predicted material consistency of the underflow of the thickener and the set of reference values comprises a target reference value for the material consistency of the underflow. Being a set-point value, this target value may be used as a primary control value during most of the process running time as long as other constraints are satisfied.

According to an embodiment, both a minimum and a maximum value may be assigned for the inventory level of the thickener. This gives more freedom for density optimization, because measurement of exact inventory level is not necessary. According to an embodiment, a maximum value may be assigned for turbidity or solids content of the overflow of the thickener.

According to an embodiment, a maximum value may be assigned for a torque exerted on a rake of the thickener. By setting a limit for the maximum torque, control parameters may be adjusted so that the limit is not exceeded in such a way that the rake would get stuck or break.

According to an embodiment, any of the control parameters may also be assigned one or more reference values. These reference values may comprise any combination of maximum, minimum and target values.

According to an embodiment, controlling a dewatering process may be performed under a condition to minimize a chemical feed rate. In such a case, a condition to minimize a chemical feed rate may be included in the determination 36 of control values. This may be done, for example, by including a term proportional to the magnitude of the chemical feed rate in the cost function.

It is noted that since the typical time scales of the settling process in a thickener are very long, it may often not be advantageous to make fast control maneuvers. Instead, by using a predictive model to estimate the future operating state of the thickener, it may be possible to optimize the control adjustments over a long time. Additionally, by using the model, various types of process constraints and conditions for the constraints may be used.

Figure 4:
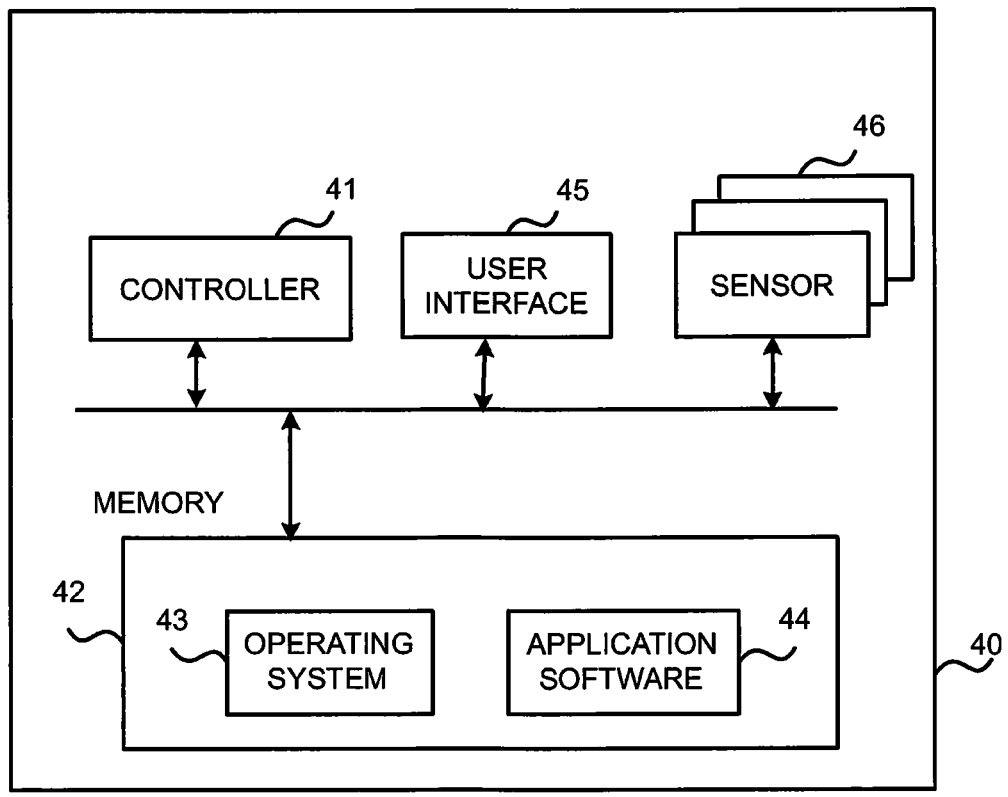
FIG. 4 is a block diagram illustration of a device for controlling a dewatering process according to an embodiment.

FIG. 4 illustrates a device 40 for controlling a dewatering process according to an embodiment. The device comprises a controller 41, a memory 42 which comprises an operating system 43 and application software 44 stored in it, a user interface 45 and one or more sensors 46. The user interface 45 is configured to receive input from a user, which may include a command to initiate a dewatering process, and/or an input including reference values for the operating parameters of a gravitational sedimentation device. The one or more sensors 46 are configured to measure at least a first and a second set of one or more values representing operating parameters of the gravitational sedimentation device. The first set may represent the material consistency of the underfloor and the second set may represent the inventory level. Other operating parameters may be measured by the one or more sensors 46, such as the parameters described in the embodiments above.

The memory 42 includes application software 44 which, when run on the operating system 43, causes the controller 41 to perform the steps described in the above embodiments. The controller 41 can also be configured to coordinate the elements 45, 46, 42 of the device 40 in order to perform timely measurement of operating parameters using the one or more sensors 46 and receive input from a user via the user interface 45, if needed. In alternative embodiments, user input can be replaced with automatically generated reference values.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the method described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An arrangement for controlling a dewatering process comprising:
    a gravitational sedimentation device comprising a tank, a lip for removing overflow from the tank and at least one underflow line for removing underflow from the tank;
    a first and a second sensor for measuring a first and a second operating parameter representing the material consistency of the underflow from the gravitational sedimentation device and the inventory level of the gravitational sedimentation device, respectively; and
    a controller for monitoring and adjusting operating parameters of the gravitational sedimentation device;
    at least one memory comprising computer program code, the at least one memory and the computer program code configured to cause the controller to:
        receive a first set of values representing the first operating parameter from the first sensor and a second set of values representing the second operating parameter from the second sensor;
        use at least the first set of values received from the first sensor and the second set of values received from the second sensor as input values for predicting an operating state of the gravitational sedimentation device; wherein the operating state is at least partially dependent on the operating parameters;
        determine at least one predicted output for an operating parameter of the gravitational sedimentation device for at least one future point in time;
        obtain a set of one or more reference values for the operating parameters of the gravitational sedimentation device;
        perform a comparison between the at least one predicted output and at least one reference value from the set of one or more reference values;
        determine, based on the comparison, at least one set of one or more control values for at least one control parameter of the gravitational sedimentation device; wherein the at least one control parameter may at least partially determine the operating state of the gravitational sedimentation device; and
        adjust, using the at least one set of control values, at least one control parameter of the gravitational sedimentation device;
    wherein the arrangement comprises a third sensor for measuring a third operating parameter representing a turbidity or solids content of the overflow; and the at least one memory and the computer program code are additionally configured to receive a third set of values representing the third operating parameter from the third sensor; wherein the third input is additionally included as input values for predicting the operating state of the gravitational sedimentation device, wherein the at least one predicted output comprises a predicted turbidity or solids content of the overflow of the gravitational sedimentation device, and the comparison comprises determining whether the predicted turbidity or solids content of the overflow is larger than a reference value for maximum turbidity or solids content of the overflow of the gravitational sedimentation device.

2. The arrangement according to claim 1, wherein the at least one memory and the computer program code are additionally configured to cause the controller to determine a cost function using as an input at least the set of reference values and at least one predicted output; wherein the comparison is performed to determine the value of the cost function, and the at least one set of control values minimizes the value of the cost function.

3. The arrangement according to claim 1, wherein the first, second, and third sets of values are time series values.

4. The arrangement according to claim 1, wherein at least one of the first, second, or third set of values is repeatedly updated and the at least one set of control values is updated in response.

5. The arrangement according to claim 1, wherein the gravitational sedimentation device comprises a rake for directing solid material towards the at least one underflow line by rotatory movement and the arrangement comprises an additional sensor for measuring an additional operating parameter representing a torque exerted on the rake and the at least one memory and the computer program code are additionally configured to receive an additional input from the additional sensor; wherein the additional input is additionally included as input values for predicting the operating state of the gravitational sedimentation device.

6. The arrangement according to claim 1, wherein the at least one control parameter is additionally included as input values for predicting the operating state of the gravitational sedimentation device.

7. The arrangement according to claim 1, wherein the gravitational sedimentation device comprises at least one of an underflow pump and an underflow valve for controlling the underflow flow rate from the gravitational sedimentation device, and the at least one control parameter comprises an underflow flow rate from the gravitational sedimentation device.

8. The arrangement according to claim 1, wherein the gravitational sedimentation device comprises a chemical dispenser for dispensing a chemical into the tank for accelerating sedimentation and the at least one control parameter comprises a chemical feed rate into the gravitational sedimentation device.

9. The arrangement according to claim 1, wherein the at least one predicted output comprises a predicted material consistency of underflow from the gravitational sedimentation device and the comparison comprises determining how much the predicted material consistency of underflow deviates from a target reference value for the material consistency of underflow from the gravitational sedimentation device.

10. The arrangement according to claim 1, wherein the at least one predicted output comprises a predicted inventory level of the gravitational sedimentation device and the comparison comprises determining if the predicted inventory level is at least one of smaller than a reference value for minimum inventory level of the gravitational sedimentation device and larger than a reference value for maximum inventory level of the gravitational sedimentation device.

11. The arrangement according to claim 5, wherein the at least one predicted output comprises a predicted torque exerted on the rake of the gravitational sedimentation device and the comparison comprises determining whether the predicted torque exerted on the rake is larger than a reference value for maximum torque exerted on the rake of the gravitational sedimentation device.

12. The arrangement according to claim 7, wherein the at least one predicted output comprises a predicted underflow flow rate of the gravitational sedimentation device, and wherein the comparison comprises determining how the predicted underflow flow rate deviates from at least one reference value corresponding to a minimum value, a maximum value or a target value.

13. The arrangement according to claim 8, wherein the at least one predicted output comprises a predicted chemical feed rate of the gravitational sedimentation device, and wherein the comparison comprises determining how the predicted chemical feed rate deviates from at least one reference value corresponding to a minimum value, a maximum value or a target value.

14. The arrangement according to claim 13, wherein determining the at least one set of control values is performed under a condition to minimize the predicted chemical feed rate.

15. A method for controlling a dewatering process in a gravitational sedimentation device, wherein the method comprises:
measuring at least a first and a second set of one or more values representing operating parameters of the gravitational sedimentation device; the first set representing the material consistency of the underflow and the second set representing the inventory level;
obtaining a set of one or more reference values for the operating parameters of the gravitational sedimentation device;
using at least the first set and the second set as input values for predicting an operating state of the gravitational sedimentation device; wherein the operating state is at least partially dependent on the operating parameters;
determining at least one predicted output for an operating parameter of the gravitational sedimentation device for at least one future point in time;
perform a comparison between the at least one predicted output and at least one reference value from the set of reference values;
determining, based at least partially on the comparison, at least one set of one or more control values for at least one control parameter of the gravitational sedimentation device;
wherein the at least one control parameter may at least partially determine the operating state of the gravitational sedimentation device; and
adjusting, using the at least one set of control values, at least one control parameter of the gravitational sedimentation device;
wherein the method comprises measuring a third set of one or more values representing operating parameters of the gravitational sedimentation device; the third set representing the turbidity or solids content of the overflow; wherein the third set is additionally included as input values for predicting the operating state of the gravitational sedimentation device, wherein the at least one predicted output comprises a predicted turbidity or solids content of the overflow of the gravitational sedimentation device and the comparison comprises determining whether the predicted turbidity or solids content of the overflow is larger than a reference value for maximum turbidity or solids content of the overflow of the gravitational sedimentation device.

16. The method according to claim 15, comprising determining a cost function using as an input at least the set of reference values and at least one predicted output; wherein the comparison is performed to determine the value of the cost function, and the at least one set of control values minimizes the value of the cost function.

17. The method according to claim 15, wherein the first, second, and third sets of values are time series values.

18. The method according to claim 15, wherein at least one of the first, second, or third set of values is repeatedly updated and the at least one set of control values is updated in response.

19. The method according to claim 15, wherein the method comprises measuring at least one additional set of one or more values representing operating parameters of the gravitational sedimentation device; the at least one additional set representing at least one of the torque exerted on a rake of the gravitational sedimentation device and a mass flow into the gravitational sedimentation device; wherein the at least one additional set is additionally included as input values for predicting the operating state of the gravitational sedimentation device.

20. The method according to claim 15, wherein the at least one control parameter comprises at least one of an underflow flow rate of the gravitational sedimentation device and a chemical feed rate of the gravitational sedimentation device.

21. The method according to claim 15, wherein the at least one predicted output comprises a predicted material consistency of underflow of the gravitational sedimentation device and the comparison comprises determining how much the predicted material consistency of underflow deviates from a target reference value for material consistency of underflow of the gravitational sedimentation device.

22. The method according to claim 15, wherein the at least one predicted output comprises a predicted inventory level of the gravitational sedimentation device and the comparison comprises determining if the predicted inventory level is at least one of smaller than a reference value for minimum inventory level of the gravitational sedimentation device and larger than a reference value for maximum inventory level of the gravitational sedimentation device.

23. The method according to claim 19, wherein the at least one predicted output comprises a predicted torque exerted on the rake of the gravitational sedimentation device and the comparison comprises determining whether the predicted torque exerted on the rake is larger than a reference value for maximum torque exerted on the rake of the gravitational sedimentation device.

24. The method according to claim 15, wherein the at least one predicted output comprises at least one of a predicted underflow flow rate of the gravitational sedimentation device and a predicted chemical feed rate of the gravitational sedimentation device, and wherein the comparison comprises determining how this at least one rate deviates from at least one reference value corresponding to a minimum value, a maximum value or a target value.

25. The method according to claim 15, wherein the at least one control parameter comprises a chemical feed rate of the gravitational sedimentation device, the at least one predicted output comprises a predicted chemical feed rate of the gravitational sedimentation device and determining the at least one set of control values is performed under a condition to minimize the predicted chemical feed rate.

* * * * *